Dec. 19, 1967  R. J. CHIABRANDY  3,358,895
FASTENER SETTING MACHINE
Filed Jan. 3, 1966  3 Sheets-Sheet 1
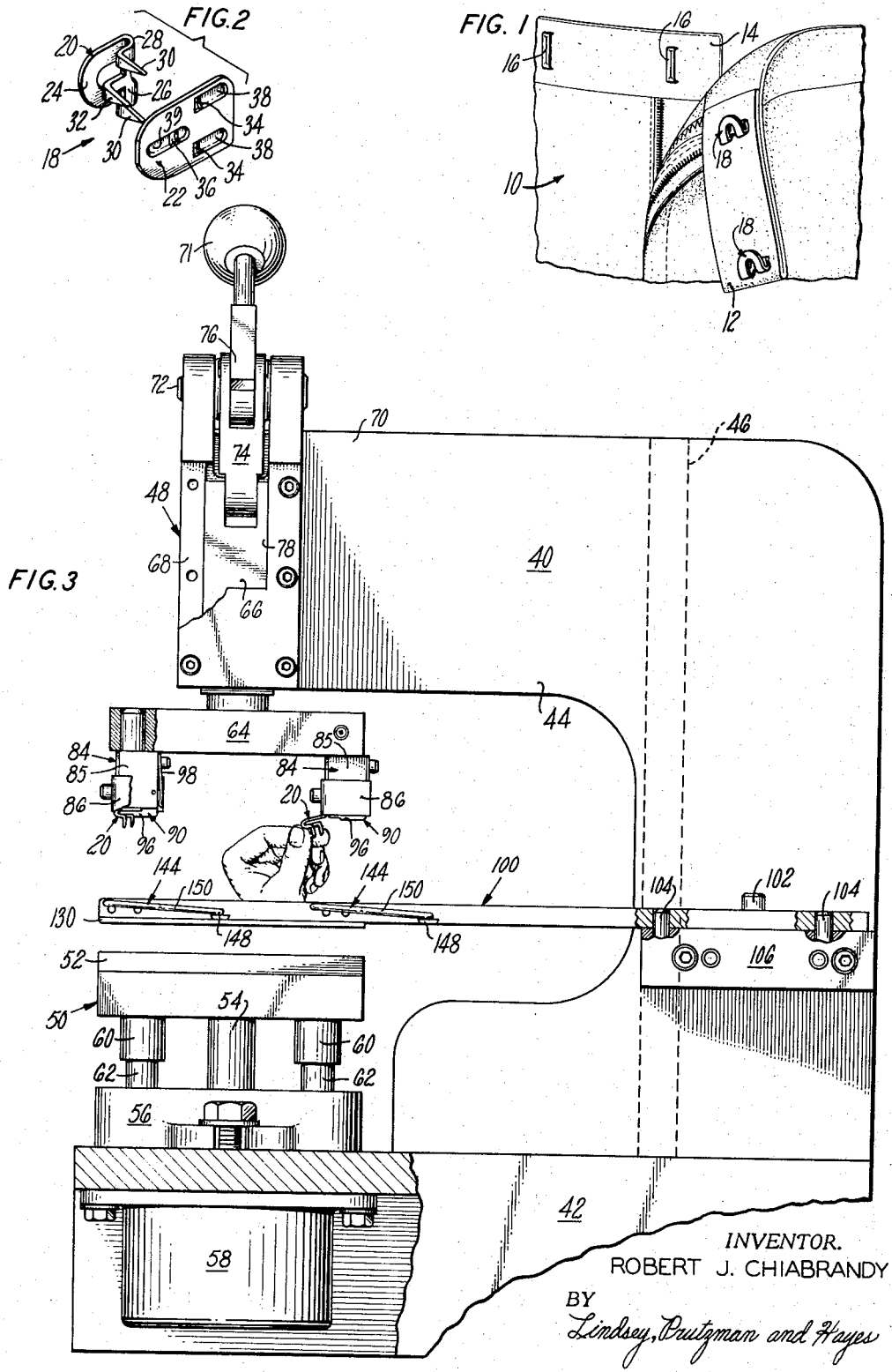
INVENTOR.
ROBERT J. CHIABRANDY
BY
Lindsey, Brutzman and Hayes
ATTORNEYS

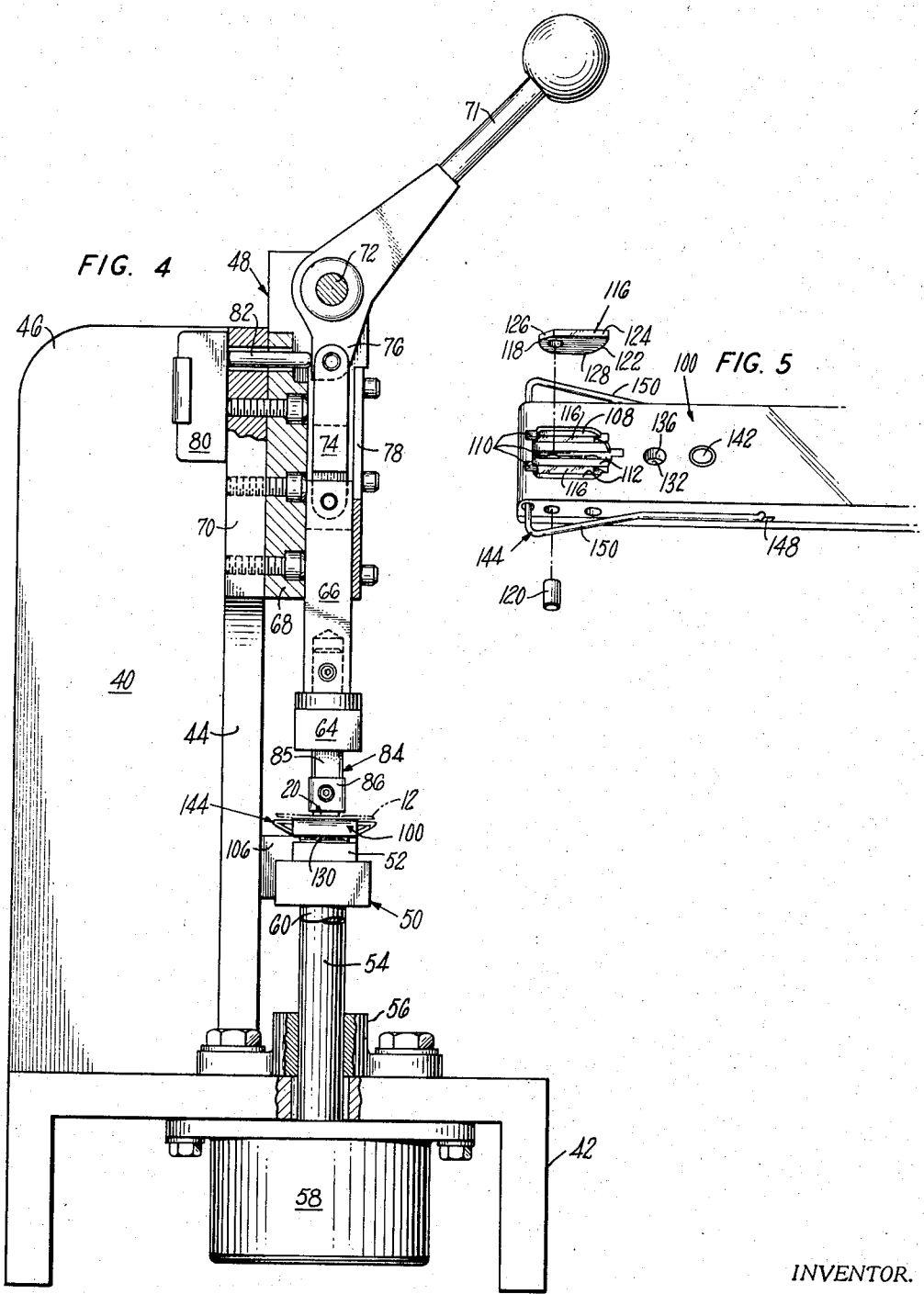

Dec. 19, 1967  R. J. CHIABRANDY  3,358,895
FASTENER SETTING MACHINE

Filed Jan. 3, 1966  3 Sheets-Sheet 3

INVENTOR.
ROBERT J. CHIABRANDY
BY
*Lindsey, Prutzman and Hayes*
ATTORNEYS

United States Patent Office 3,358,895
Patented Dec. 19, 1967

3,358,895
FASTENER SETTING MACHINE
Robert J. Chiabrandy, Saugus, Mass., assignor to North
and Judd Manufacturing Company, New Britain, Conn.,
a corporation of Connecticut
Filed Jan. 3, 1966, Ser. No. 518,114
6 Claims. (Cl. 227—15)

ABSTRACT OF THE DISCLOSURE

The machine of this invention includes a fixture cantilever mounted on a frame and having an elongated free end portion with an opening formed therethrough for communicating with an aperture of an apertured fastener part, first and second operating members disposed on opposite sides of the fixture and reciprocable along a common axis of movement generally perpendicular to the longitudinal axis of the free end portion of fixture to establish retracted and extended positions relative thereto, and a prong deflector movable in the opening in the free end portion of the fixture responsive to the second operating member being moved into extended position for clenching a pronged fastener part carried by the first operating member when it is positioned in its extended position.

---

This invention relates to machines for applying a fastener device to fabric and particularly concerns machines for attaching fasteners such as hook and eye fasteners to wearing apparel.

A primary object of the invention is to provide an improved fastener setting machine which is particularly suited to provide a prong clenching operation of increased efficiency in the attachment of a pronged fastener member to a backing member with a fabric interposed between the components of the fastener.

Another object of the invention is to provide an improved fastener setting machine of the type described wherein prong clenching forces are transmitted directly to the prongs of a pronged fastener member to effect a superior clenching operation and maximum strength of assembly.

A further object of the invention is to provide an improved fastener setting machine which provides a completely flat closure between a pronged fastener member and a backing member to essentially prevent relative movement of the fastener components and to minimize chafing of a fabric in contact with the fastener assembly.

Another object of the invention is to provide an improved fastener setting machine which may be used to attach a hook and eye fastener to an extension waistband of a garment, e.g., and which facilitates its proper positioning in the machine for a quick and easy fastener attaching operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a view showing a garment having a pair of hook and eye fasteners attached to overlapping garment portions illustrated in disassembled relation;

FIG. 2 is an isometric view showing two members of a hook fastener before assembly;

FIG. 3 is a side elevational view, partly broken away, showing a preferred embodiment of a fastener setting machine of the invention wherein upper and lower ram assemblies of the machine are illustrated in retracted position;

FIG. 4 is a front elevational view of the machine, partly broken away and partly in section, showing its upper and lower ram assemblies in extended position;

FIG. 5 is a fragmentary isometric view, partly exploded, showing a fixture incorporated in the machine;

Figure 6:
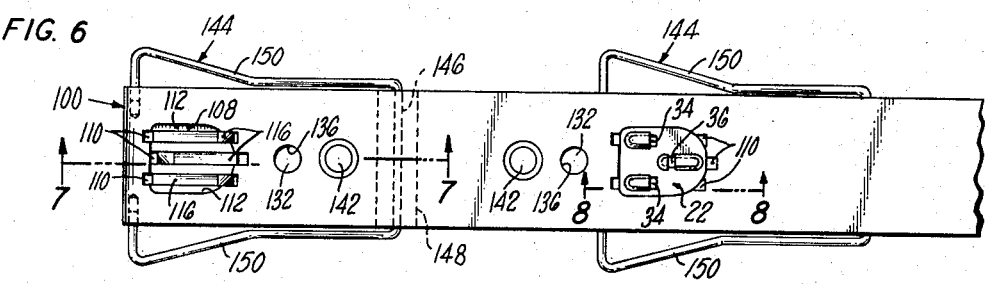
FIG. 6 is a top plan view of the fixture, partly broken away, showing a back plate of a hook fastener as being positioned thereon.
Figure 7:
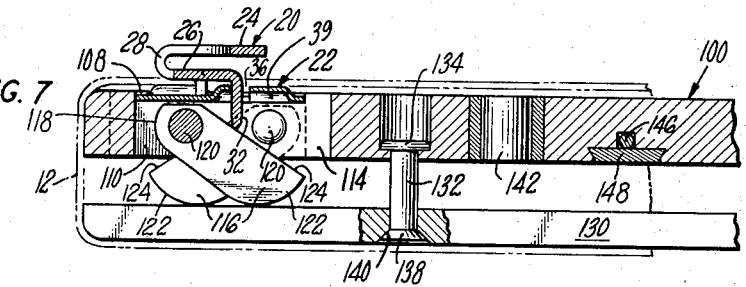
Figure 8:
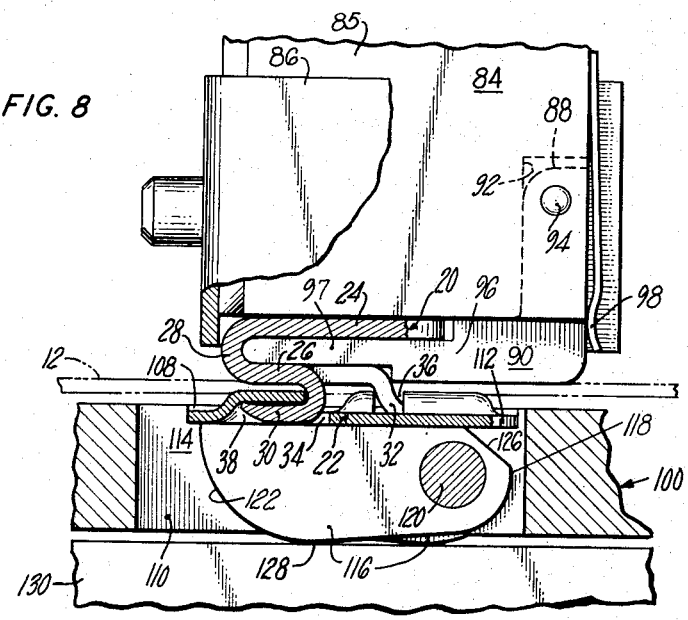

FIG. 7 is an enlarged sectional view, partly broken away, taken along line 7—7 of FIG. 6 and showing in full lines a hook fastener positioned on the fixture before being attached to an extension waistband which is positioned thereon and illustrated in broken lines; and FIG. 8 is an enlarged sectional view, partly broken away, taken along line 8—8 of FIG. 6 and showing in full lines a portion of the upper ram assembly of the machine in extended position upon completion of a prong clenching operation attaching a hook fastener to an extension waistband illustrated in broken lines.

Referring in detail to the drawings, a garment 10 is shown for illustrative purposes in FIG. 1 having an extension waistband 12 for overlapping a right-hand flap portion 14 having a pair of attached eye stays 16. A pair of complementary hook fasteners 18 are attached to the extension waistband 12. Each hook fastener 18 comprises a hook 20 and a complementary back plate 22 which are shown in FIG. 2 before being attached to the extension waistband 12. It will be understood that the back plate 22 is to be received inside the pocket formed by the extension waistband 12 for securing the hook 20 in position for detachably securing an eye stay 16 in a well known manner.

Each hook 20 includes a flat U-shaped tongue portion 24 integrally connected with a spaced base portion 26 by a stepped portion 28 whereby a clearance is provided between the tongue and base portions 24 and 26 for detachably securing an eye stay 16. A plurality of attaching prongs 30 and 32 project from the base portion 26 in a perpendicular direction away from the tongue portion 24. In the specific emboiment, an outer pair of prongs 30 project from opposite side edges of the base portion 26 in offset relation to the stepped portion 28, and a third intermediate prong 32 is spaced from the stepped portion 28 a greater distance than the outer pair of prongs 30. Each prong is tapered to a needle-like tip to readily pierce the extension waistband 12.

The back plate 22 of each hook fastener 18 is a generally flat rectangular member of enlarged size relative to the base portion 26 of the hook 20. A plurality of spaced apertures 34 and 36 are provided in back plate 22 through which the prongs 30 and 32 pass after having pierced the extension waistband 12 overlying the back plate 22. The outer pair of prongs 30 are housed in a pair of suitably dimensioned recesses 38 extending longitudinally of the back plate 22, and an intermediate recess 39 extends in an opposite direction for housing the third intermediate prong 32 upon completion of the assembly operation.

A fastener setting machine is shown in FIGS. 3–8 for attaching the above described hook fastener 18 to the extension waistband 12 of the garment 10, although it is to be understood that the machine is not limited to this application or it is equally useful, e.g., in attaching the eye stays 16 to the flap portion 14 of the garment 10. The machine includes a stationary frame 40 comprising an inverted U-shaped base 42 upon which a C-shaped head 44 is rigidly fixed by means of an upright brace 46 integral with the base 42.

Upper and lower ram assemblies 48 and 50 are mounted on the frame 40 for reciprocating rectilinear movement toward and away from one another, preferably along a common axis of vertical movement. The lower ram assembly 50 includes a horizontal thrust block 52 fixed to an upper end of a plunger 54 which extends vertically downward through a fixed base plate 56 to a conventional double-acting power cylinder 58 for operating the plunger 54. The power cylinder 58 is secured below the base 42 and is provided with the usual fluid connections, not shown. To assure that the thrust block 52 is limited to vertical reciprocating movement, a pair of guide sleeves 60 are secured to the bottom of the thrust block 52 on opposite sides of the plunger 54 for telescopically receiving a pair of fixed pillars 62 extending upwardly from the base plate 56.

A horizontal carrier block 64 of the first or upper ram assembly 48 is positioned in oppositely facing relation to the thrust block 52 and is rigidly fixed at the lower end of a movable center post 66 received for sliding movement in a housing 68 bolted to an overhanging upper arm 70 of the C-shaped head 44. To reciprocate the carrier block 64, a hand operating lever 71 is mounted on a pivot pin 72 supported at the top of the housing 68, and a connecting link 74 is pivotally secured to the upper end of the center post 66 and to an eccentric lug 76 at the lower end of the operating lever 71. The housing 68 is provided with a vertically extending slot 78 to accommodate the pivotal movement of the connecting link 74 responsive to the actuation of the operating lever 71.

In the specific embodiment, the operation of the second or lower ram assembly 50 is controlled by a commercially available microswitch 80 which is supported on the upper arm 70 of the head 44 and connected in a well known manner to the power cylinder 58. When the upper ram assembly 48 is lowered from its retracted position shown in FIG. 3 to its extended position shown in FIG. 4, in response to a clockwise movement of the operating lever 71 to the position shown in FIG. 4, the eccentric lug 76 is seated inside the housing 68 to engage an actuating pin 82 operatively connected to the microswitch 80. This causes the power cylinder 58 to automatically raise the lower ram assembly 50 from its retracted position shown in FIG. 3 to its extended position shown in FIG. 4. Likewise, upon moving the operating lever 71 counterclockwise to retract the upper ram assembly 48, the actuating pin 82 is disengaged from the eccentric lug 76 thereby causing the lower ram assembly 50 to be lowered into its retracted position.

A pair of hook holders 84 are secured to the carrier block 64 below its opposite ends. Each holder 84 has a generally rectangular body 85. A U-shaped bracket 86 is screw mounted to the body 85 to extend about three of its sides and is directed toward the rear of the machine. The U-shaped bracket 86 projects downwardly a short distance beyond the bottom surface of the body 85. An upright leg 88 of an L-shaped foot 90 is pivotally mounted in a vertically extending recess 92 (FIG. 8) at the rear of the body 85, the leg 88 being supported on a pin 94 secured to the body 85 such that a horizontal leg 96 of the L-shaped foot 90 is directed toward the closed end of the U-shaped bracket 86.

The horizontal leg 96 includes a free end portion 97 of reduced thickness which is spaced from the bottom surface of the body 85 to form a compartment with the depending walls of the U-shaped bracket 86 for seating the tongue portion 24 of the hook 20. The tongue portion 24 thus may be carried upon the horizontal leg 96 upon being pushed in from left to right, as viewed in the drawings, to an extent limited by the free end portion 97 of the leg 96 which is engageable with the stepped portion 28 of the hook 20. This operation may be performed manually and is facilitated by the pivotal movement of the L-shaped foot 90 which upon being released is biased by a flat spring 98 screw mounted to the rear of the body 85 to firmly retain the hook 20 in proper position with its prongs 30, 32 directed vertically downward from the holder 84.

To support the back plates 22 in alignment with the hooks 20 carried by the upper ram assembly 48, as well as to properly position the extension waistband 12 for a fastener attaching operation, a generally flat rectangular arm or fixture 100 is cantilever supported on the frame 40 and extends horizontally outward between the upper and lower ram assemblies 48 and 50. In the specific illustrated embodiment, the fixed end of the cantilever fixture 100 is shown as being secured to the C-shaped head 44, and an intermediate portion of the fixture 100 adjacent its free end is always maintained in spaced apart relation between the upper and lower ram assemblies 48 and 50 even in their extended positions. A fastener 102 and a pair of dowels 104 secure the fixed end of the fixture 100 to a support 106 screw mounted on the side of the C-shaped head 44.

A pair of generally rectangular recesses 108 are formed in the upper surface of the fixture 100 intermediate its ends for seating a pair of back plates 22 of the hook fastener 18 with their apertures 34, 36 in proper alignment with the prongs 30, 32 of the hooks 20 carried by the hook holders 84 of the upper ram assembly 48. Each recess 108 is in communication with three slots 110 extending longitudinally through the fixture 100, the slots 110 being of slightly greater length than the recesses 108. The back plates 22 may be manually positioned in the recesses 108 and supported upon the top edges 112 of the walls 114 defining the slots 110. The slots 110 are spaced apart such that upon seating the back plates 22 their recesses 38, 39 each face downwardly into a slot 110.

After an open end of the extension waistband 12 is slipped into position over the free end of the cantilever fixture 100, the operating lever 71 is then moved clockwise to lower the upper ram assembly 48 into extended position. This positions the upper ram assembly 48 just above the fixture 100 with a predetermined clearance between its upper surface and the bottom of the hook holders 84. The prongs 30, 32 of the hooks 20 pierce the inside fold of the extension waistband 12 and pass through the unsupported portion of the fabric and straight through the apertures 34, 36 of the underlying back plates 22 so as to be held in the slots 110 in the position shown in FIG. 7. Thus, the needle-like tips of the prongs 30, 32 tend to pierce the unsupported fabric without crushing or cutting its threads.

The prongs 30, 32 are now conditioned to be deflected into their respective recesses 38, 39 in the back plates 22. For this reason, a prong clenching finger 116 is supported on the fixture 100 for pivotal movement in each slot 110. Each finger 116 is secured at an apertured end 118 by a separate pivot pin 120 supported by the walls 114 on the opposite sides of its respective slot such that an opposite swinging end 122 of the finger is positioned below the recess in the back plate 22 overlying its slot.

To effect a completely flat closure of the prongs 30, 32 on the back plate 22, a flat contact surface 124 is provided on each of the fingers 116 for engaging the prongs of the hook 20. The flat contact surface 124 extends along the upper edge of each finger 116 from its swinging end 122 to an inclined edge 126 at its opposite end 118. Before the prongs of the hook 20 are bent over, the fingers 116 are retained in the position shown in FIG. 7 with the flat contact surface 124 extending downwardly at an angle to the longitudinal axis of the fixture 100.

The fingers 116 are contoured such that the width of each finger is of greater dimension than the distance between the bottom surface of the fixture 100 and the top edges 112 of the walls 114. Thus, a lower edge 128 of each finger 116 will always be positioned below the bottom surface of the fixture 100 even when its flat contact surface 124 is raised from the angular position shown in FIG. 7 into the horizontal position shown in FIG. 8.

A finger operating bar 130 is suspended below the fixture 100 to apply a uniform driving force to the smoothly contoured lower portions of each finger 116 in response to the raising of the lower ram assembly 50 from its retracted to extended position. The operating bar 130 is attached below the fixture 100 by means of a pair of guide pins 132, arranged to mount the operating bar 130 in face-to-face relation with the bottom surface of the fixture 100. Each guide pin 132 has an enlarged upper head 134 received for vertical sliding movement in a counterbored hole 136 formed in the fixture 100 and an enlarged lower head 138 secured in an aligned countersunk aperture 140 provided in the operating bar 130.

After the upper ram assembly 48 is lowered into its extended position, the flat contact surfaces 124 of the fingers 116 are engaged by the vertically extending pronged tips of the hooks 20 and the swinging ends 122 rest upon the operating bar 130 which is spaced apart a preselected distance below the fixture 100 by the guide pins 132. Immediately thereafter, the lower ram assembly 50 is automatically raised from retracted to extended position under the driving force of the power cylinder 58. This causes the finger operating bar 130 to be forced upwardly by the thrust block 52 to smoothly and rapidly clench the prongs 30, 32 of the hook 20 into assembled position within the recesses 38, 39 of the back plate 22.

By virtue of the upper flat contact edges 124 of the finger 116, the prongs of the hook 20 are precisely deflected through a sharp 90° locking angle so as to be directly engaged along their full bent-over length in surface-to-surface contact with the back plate 22. This securely fixes the hook fasteners 18 to the extension waistband 12 and minimizes any possibility of relative movement of the fastener components. It will be noted that the resulting assembly is substantially flat thereby to prevent bent-over prongs providing a raised surface which would tend to chafe the extension waistband 12 and cause premature wearing of the fabric.

During the above described prong clenching operation, the fingers 116 are essentially trapped in position between the prongs of the hooks 20 and the fingers operating bar 130. In view of the clearance provided at all times by the contoured fingers 116 between the fixture 100 and the finger operating bar 130, a highly efficient prong clenching operation is provided wherein essentially all clenching forces are transmitted directly to the prongs of the hooks 20.

The fixture 100 preferably includes a pair of magnets 142 spaced apart axially of the fixture 100 for releasably maintaining the finger operating bar 130 in its raised position against the bottom of the fixture 100. Thus the open inner end of an extension waistband 12, e.g., may be readily slipped over both the fixture 100 and finger operating bar 130 at the beginning of a fastener attaching operation.

To further facilitate proper positioning of the extension waistband 12, a pair of resilient spring wire members 144 are provided on the fixture 100. Each member 144 has a connecting portion 146 shown by dotted lines in FIG. 6 as being spaced from the recess 108 toward the rear of the machine. Each connecting portion 146 extends across the fixture 100 and is secured in place by means of a fixed plate 148. A pair of spring arms 150 extend from the ends of the connecting portion 146, axially along opposite side edges of the fixture 100 toward its free end. The forward ends of the arms 150 are biased laterally outwardly from the side edges of the fixture 100 adjacent the recesses 108 and are then bent laterally inwardly so as to be received in an opening formed in the side edge of the fixture 100. It will be seen that the outwardly biased portions of the spring arms 150 tension the unsupported portions of the extension waistband 12 overlying the recesses 108 so as to be readily pierced by the needle-like tips of the pronged hook 20. The axially extending portions of the spring arms 150 serve to engage the opposite edges of the extension waistband 12 and properly center it on the cantilever fixture 100.

After the fastener attaching operation is completed, the spring members 144 may be flexed inwardly to release the tension on the extension waistband and the operating lever 71 is moved counterclockwise to partially raise the upper ram assembly 48. Thereafter, the pivotally mounted L-shaped foot 90 facilitates the tongue portion 24 of the hook fastener 18 to be readily slipped out of the holder 84 to release the extension waistband 12 for removal. Its open inner end then merely needs to be sewn closed.

In summary, the fastener setting machine of the invention effects a strong attachment of the fastener to a garment and effectively assures a flat closure between a pronged fastener member and a back plate of the fastener to minimize any chafing between the garment and the fastener assembly. The cantilever fixture incorporated in the machine is particularly suited to provide a highly efficient prong clenching operation as well as to properly center and tension an extension waistband of a garment to facilitate assembly.

As will be apparent to persons skilled in the art, various modifications and adaptations of the structure above described will become readily apparent without departure from the spirit and scope of the invention, the scope of which is defined in the appended claims.

I claim:

1. A machine for attaching a two-part fastener to the outside and inside of a pocket formed by extension waistbands and the like comprising a frame, a fixture, means supporting said fixture at only one end thereof on said frame, said fixture having an elongated free end portion insertable into a pocket formed by an extension waistband, said free end portion having an opening therethrough communicating with an aperture of an apertured fastener part when the same is received in an assembly position on said free end portion, first and second operating members disposed on opposite sides of said fixture and mounted on said frame for reciprocating rectilinear movement along a common axis generally perpendicular to the longitudinal axis of said free end portion of said fixture between retracted and extended positions relative thereto, and prong deflecting means movable in said opening in said free end portion of said fixture in response to said second operating member being moved from retracted to extended position for clenching a pronged fastener part when it is positioned in said opening by said first operating member being moved from retracted to extended position.

2. The machine of claim 1 including spring means mounted on said fixture and biased laterally outward of said opening in said free end portion for tensioning an unsupported portion of an extension waistband extending over said opening, thereby to facilitate its being pierced without being crushed or cut by a pronged fastener part carried by said first operating member.

3. The machine of claim 2 wherein said spring means includes a pair of wire spring members supported on opposite side edges of said fixture, said wire spring members each having a first portion extending axially alongside said fixture toward its free end for engaging a folded edge of an extension waistband to center the same on said fixture, and a second portion biased laterally outward of said free end portion adjacent said opening therein for tensioning an unsupported portion of an extension waistband extending over said opening.

4. The machine of claim 1 wherein said prong deflecting means includes a prong clenching finger supported on said fixture for pivotal movement in said opening of said free end portion thereof, said prong clenching finger having a contoured edge portion continuously positioned outside said opening for transmitting prong clenching forces directly to a pronged fastener part in response to said second operating member being moved from retracted to extended position.

5. The machine of claim 4 wherein said prong clenching finger includes a flat contact surface engageable with a pronged fastener part for bending the same through a sharp 90° locking angle.

6. The machine of claim 4 wherein said prong deflecting means includes an operator bar interposed between said fixture and said second operaitng member, said operator bar engaging said contoured edge portion of said finger and being maintained thereby in spaced relation to said fixture, said operator bar being supported on said free end portion of said fixture for movement along an axis perpendicular thereto in response to said second operating member being moved from retracted to extended position.

References Cited
UNITED STATES PATENTS

| | | | |
|---|---|---|---|
| 2,794,981 | 6/1957 | Brayton | 227—15 |
| 3,069,688 | 12/1962 | Heil | 227—18 |
| 3,220,628 | 11/1965 | Bashier | 227—15 |

GRANVILLE Y. CUSTER, JR., *Primary Examiner.*